Patented Aug. 8, 1939

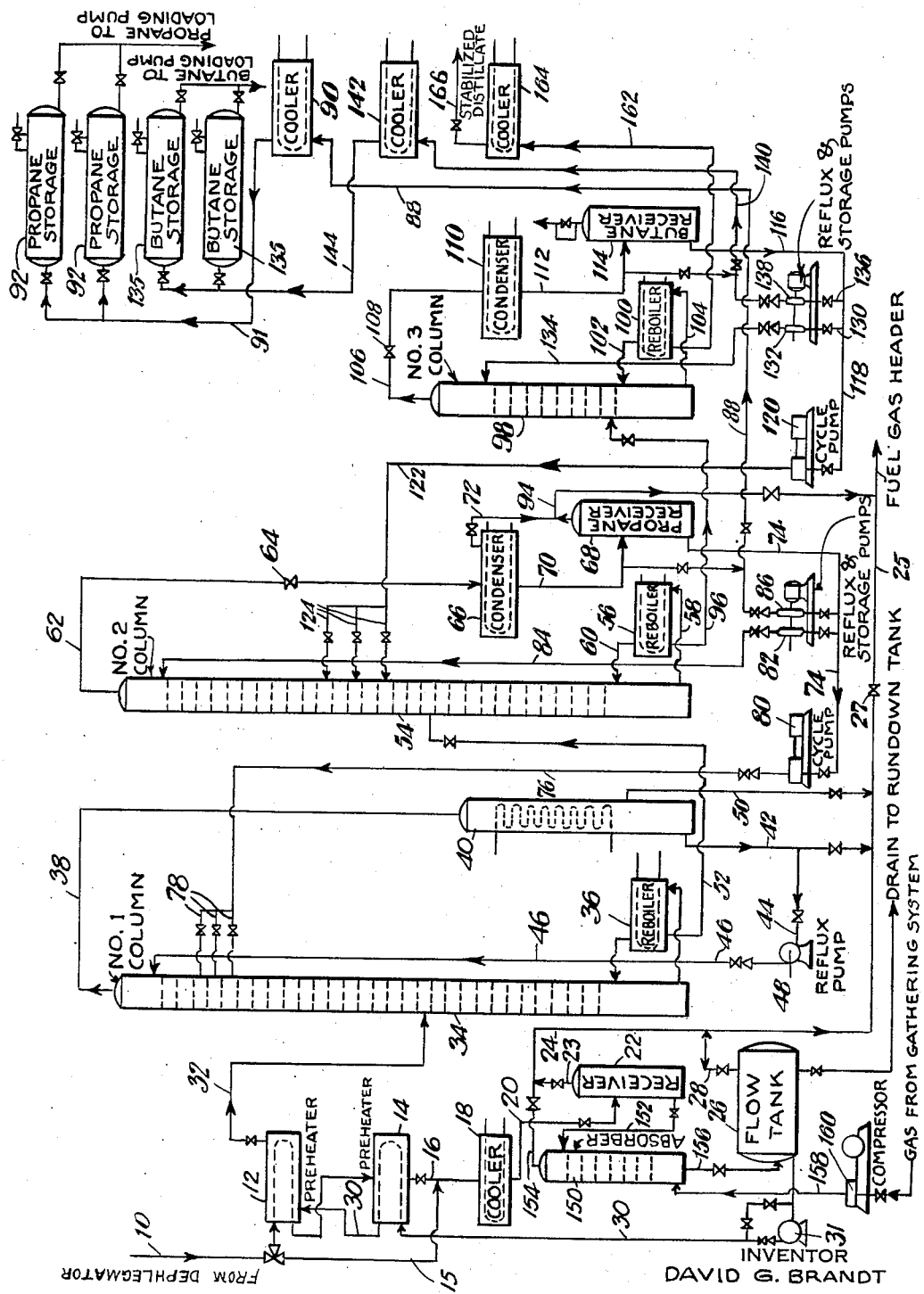

2,168,316

UNITED STATES PATENT OFFICE 2,168,316

DISTILLATION AND FRACTIONATION PROCESS AND APPARATUS

David G. Brandt, Westfield, N. J., assignor to Power Patents Company, Hillside, N. J., a corporation of Maine Original application July 1, 1931, Serial No. 548,062. Divided and this application October 7, 1936, Serial No. 104,387

26 Claims. (Cl. 196—11)

The present invention relates to distillation process and apparatus, and more particularly it concerns the distillation of liquid hydrocarbon mixtures such as crude petroleum oils or the hydrocarbon mixtures produced by the pressure distillation of crude petroleum oils. The invention is of especial utility in connection with the stabilization of cracked hydrocarbon distillates to adapt the same for use as motor fuel and for other purposes; and it permits the concurrent recovery of a large portion of the propane and of the butane components of the unstabilized hydrocarbon mixtures.

This application is a division of pending application Serial No. 548,062, filed July 1, 1931, for "Distillation process and apparatus".

Among the more important objects of the invention are to provide in a novel manner for the distillation of liquid hydrocarbon mixtures with the concurrent recovery of selected fractions thereof; to provide in a novel manner for limiting polymerization of liquid hydrocarbon mixtures during distillation; to provide a novel method for the stabilization of liquid hydrocarbon mixtures with a concurrent recovery of propane and butane fractions; to provide in a novel manner for controlling the maximum temperature at the base of a stabilizing column; and to provide a novel method for the separate recovery from the rich gases of a crude still receiving house or of gasoline run down tanks, of the respective propane and butane contents thereof.

In its broadest scope the invention resides in the distillation of a hydrocarbon mixture such as crude petroleum oil or a distillate thereof. In a preferred form of the invention the material to be processed is distilled in a series of fractionating columns so interassociated that the liquid mixture after being processed in the first column is introduced into the mid-portion of the second column; and the processed liquid in the base of the second column is subsequently introduced into the mid-portion of a third column; and the invention includes the control of the temperatures in the base of each of the first two columns by the combined use of a selected part of the condensed vapors from such column and a selected portion of the condensate recycled from the immediately following column. By this practice the vapor pressure of the combined vapors in the respective fractionating columns is increased to the point where this recycled liquid flows to the base of the column and the lighter ends of the hydrocarbon mixture to be volatilized are suitably released from the liquid at the base of the column at the lowest possible temperatures. The recycled liquid then flows with the other liquid hydrocarbons from the base of each column into the succeeding fractionating column. The time of treatment of the liquid hydrocarbons in the base of each column is in this manner reduced to a minimum, thus retarding polymerization of the hydrocarbons, even where temperatures are employed at which polymerization normally occurs in the usual methods employed prior to my invention.

While the invention resides in apparatus and process for distilling of liquid mixtures containing components of different boiling points, such as mixtures of hydrocarbons, it is exemplified below, for purposes of illustration, in a process and apparatus for the stabilization of hydrocarbon distillates in which it has especial utility.

According to the usual methods of stabilizing pressure distillates from petroleum cracking operations, a single fractionating column is employed; and the overhead product flowing from that column is a mixture of methane, ethane, and propane, together with, in most instances, a portion of the butane content of the unstabilized distillate.

In the past, this method of stabilization has not been completely satisfactory, since the overhead product, containing certain valuable hydrocarbons, has ordinarily been employed for fuel purposes only. In recent years, however, there has been a constantly growing demand for propane and butane for certain special uses; and these hydrocarbon fractions are marketable as such. Natural gasoline and the vapors from the pressure cracking of hydrocarbon oils are rich in these hydrocarbons and it is therefore economically desirable to separate therefrom and recover such fractions. This may now be accomplished in connection with liquid hydrocarbon stabilizing operations by the practice of the present invention.

The attached drawing illustrates somewhat diagrammatically one form of apparatus exemplifying the invention. In the drawing, conduit 10 is a line for conducting vapors and fixed gases from a cracking still dephlegmator into one of a series of heat exchangers 12, 14. A valved outlet line 16 for the mixed condensate and gas connects the heat exchanger 14 with a final cooler 18 for the condensate and gas. A valved conduit 15 also connects line 10 directly with the line 16 to the cooler. A valved conduit 20 conducts the condensate and gas from the cooler 18 to a receiver 22. Any fixed gas separating from the condensate in the receiver 22 is conducted through a conduit 24 to a fuel gas header 25 and to storage.

The receiver 22 is also in valve-controlled communication with a flow tank 26 through the valved conduits 24 and 28. A conduit 30 having therein a pump 31 conducts liquid under pressure from the flow tank 26 through the preheaters 14 and 12 in series, and thence through a valve-controlled conduit 32 into the vertical mid-portion of a fractionating column 34 of well-known construction. Connected with the lower portion of the column 34 is an indirect heater or reboiler 36 adapted to maintain the liquid in the bottom of column 34 at a predetermined raised temperature.

A vapor line 38 leads from the top of the column 34 to a condenser and cooler 40. Liquids condensed in the condenser 40 flow therefrom through valve-controlled line 42, and may be conducted in whole or in part into the upper portion of the column 34 through the valve-controlled lines 44 and 46 by means of a reflux pump 48. A mid-portion of the condenser 40 is connected through a valved conduit 50 with the fuel gas header 25 in the manner shown.

A valve-controlled line 52 connects the reboiler 36 with the mid-portion of a second fractionating column 54 and serves for conducting partially stabilized distillate from the column 34 to column 54. Column 54 has associated with its lower portion a reboiler 56 adapted, like reboiler 36, to be heated by high pressure steam and having connections 58 and 60 for recycling the reheated liquid to the bottom of the column 54.

A vapor line 62, having therein a pressure relief valve 64, connects the top of the column 54 with a condenser 66. Condensate from 66 flows to a propane receiver 68 through a line 70, while fixed gases flow from the said condenser 66 through the valve-controlled line 72. The fixed gases from condenser 66 and receiver 68 pass to the fuel gas header 25 through the valve-controlled lines 72 and 94.

The propane receiver 68 is connected with the upper portion of the column 34 by means of the valve-controlled conduits 74 and 76, branch conduits 78, and cycle-pump 80. Similarly the propane receiver 68 is in controlled communication with the upper portion of the column 54 through the conduit 74, reflux pump 82 and valve-controlled conduit 84. The said receiver 68 is also in controlled communication through conduit 74, storage pump 86 and valved conduit 88 with a propane cooler 90 and thence through line 91 with propane storage vessels 92.

A valved conduit 96 connects the reboiler 56 with the mid-portion of a third fractionating column 98. A reboiler 100 is connected with the lower portion of the stabilizing column 98, through the conduits 102 and 104, and serves for heating the body of partially stabilized distillate maintained in the bottom of that column. A vapor line 106, having therein a pressure relief valve 108, connects the top of the stabilizing column 98 with a condenser 110. An outlet line 112 leads from the condenser to a butane receiver 114.

The butane receiver is in controlled communication with the upper mid-portion of the fractionating column 54 through the valved lines 116, 118, cycle-pump 120, line 122 and the valve-controlled branch lines 124, 124. Similarly the butane receiver is in controlled communication with the upper portion of the fractionating column 98 by means of the conduits 116, 130, reflux pump 132, and valved conduit 134. The receiver 114 is also in communication with butane storage tanks 135 through the lines 116, 136, storage pump 138, line 140, cooler 142 and line 144.

A conduit 162 leads from the reboiler 100 to a cooler 164, from thence the cooled and stabilized distillate is conducted through valved conduit 166 to a stabilized distillate treating plant.

For use in receiving propane and butane from the gases from the gathering system of the cracking units, the lower part of the receiver 22 is connected with the upper portion of an absorber column 150 of well-known construction, by means of a valved line 152. The top of the absorber is connected with the fuel gas header 25 through the valved conduit 154 and conduit 24. A valve-controlled line 156 connects the bottom of the absorber 150 with the flow of tank 26. Likewise a gas line 158 having therein a compressor pump 160 leads to the lower portion of the absorber 150 from the gasoline run-down tanks or from a source of rich gases in the crude still receiving house.

In the preferred practice of the invention in connection with the stabilization of pressure distillates from a hydrocarbon cracking operation, the vapors and fixed gases from the cracking still dephlegmator flow successively through line 10, and heat exchangers 12 and 14, in each of which a considerable portion of the heat contained therein is utilized for heating unstabilized distillate flowing to the first fractionating column 34. The resultant condensate and gas flow from heat exchanger 14 into the final cooler 18 where they are cooled to approximately 70° F., and in which considerable additional portions of the vapors are condensed. The mixed condensate, vapors and gases then flow into receiver 22.

The heat exchangers 12 and 14, cooler 18, and the receiver 22 are maintained at substantially the cracking still-operating pressure—i. e. for example, approximately 235 lbs. per square inch, gauge—in order to condense all constituents condensible under these conditions and leave a substantially dry gas. The "dry" or fixed gases flow from the receiver 22 through valved conduit 23 and conduit 24 to the fuel gas header 25 past the pressure relief valve 27.

The distillate collected in the receiver is forced through line 152 into the top of absorber tower 150 where it flows downwardly countercurrent to a flow of rich gases being pumped into the lower portion of the absorber through line 158 from the crude still receiving house or from gasoline run down tanks. The thus-enriched distillate then flows to tank 26 through conduit 156.

This distillate in the flow tank contains all of the pentane and heavier components of the cracking still vapors and considerably more propane and butane than could be condensed from the latter at low pressures or pressures below the cracking still pressure—together with additional propane and butane recovered from the gases of the gathering system.

The enriched pressure distillate is then introduced into the mid-portion of the first column 34 through a pressure very substantially greater than the cracking still-operating pressure. This is accomplished by means of the pump 31 which forces the unstabilized distillate from the flow tank 26 under high pressure in series through preheaters 14 and 12, and through line 32 to the column 34.

Where the maximum propane recovery is desired, a pressure of approximately 400 pounds per square inch, absolute, at the top of column 34 is employed. The pressure at which this column is operated will be determined by the per cent of propane that it is desired to recover. The quantity of propane necessarily released with the methane and ethane from the first column of the stabilizing unit through line 38 decreases with increased column pressure. Since the loss of propane is undesirable, the column 34 is necessarily operated at higher pressures than are usual in stabilizer operation.

The vapors and gases from the first fractionating column flow through line 38 to the condenser 40 where portions of the vapors are condensed; and all or a selected portion of such condensate is returned as reflux to the upper part of the said column through the line 46.

The methane and ethane, together with the small amount of propane in equilibrium therewith at the temperatures and pressure existing in condenser 40—are released as gas from the latter and pass into the fuel gas header 25. These conditions in the condenser are maintained such as to keep at a minimum the per cent of propane thus carried away with these fixed gases. These gases contain about 16% by volume of propane under the conditions of operation named,—the balance of the gas being methane and ethane.

Pressures in the column 34 and condenser 40 can be maintained quite constant by proper adjustment of the valves in conduits 42 and 50, because of the relatively large proportion of fixed gases in the vapors flowing from column 34.

The pressure distillate at the bottom of column 34 is preferably maintained at a temperature not exceeding 300° F. The condensate refluxed through line 46 is in amounts and at a temperature adapted to maintain a normal operating temperature of around 70° F. in the upper portion of the column 34. In addition to the heat supplied to the unstabilized distillate by the heat exchangers 12 and 14—the reboiler 36 is employed to supply heat required for maintaining the desired bottom of column operating temperature. Propane recycled from the second fractionating column 54 in a manner subsequently to be described preferably is employed to assist in developing the necessary vapor pressure at the bottom of column 34 at the maximum operating temperature, which is preferably of 300° F. or less.

The partially-stabilized pressure distillate or liquid in the base of this column, free from methane and ethane is then transferred to the mid-portion of the fractionating column 54, where it is treated for the production therefrom of a fractionated cut of propane which is removed overhead.

The second fractionating column 54 is operated at a pressure substantially less than the operating pressure in the column 34. For example, a pressure of approximately 210 pounds per square inch, absolute, and a top-of-column temperature of 110° F. is satisfactory. The bottom-of-column temperature preferably should not exceed 300° F. A partial evaporation will result, upon the reduction of the pressure on the distillate from that of the first column to that of the lower portion of the second column.

The reboiler 56 supplies additional heat thus made necessary by revaporization at the base of the column 54 caused by this reduction of pressure. In this way, the desired temperature and reflux ratio can be maintained in the column. The reducing valve 64 in the vapor line leading from the second column facilitates the maintenance of a uniform temperature and pressure in this column, and makes possible the condensation of the vapors from the column 54 at a lower pressure than that in the column; so that any variation in the operating temperature of the condenser will not be reflected in the operation of the column.

The overhead product through line 62 will be composed of propane, one portion of which will be refluxed in the column 54 for increasing therein the partial pressure of the propane; and another portion of which will be recycled in column 34 for the purpose of increasing the mol per cent of propane in the body of hydrocarbons in the base of that column. The balance of the propane is conducted to storage.

The partially-stabilized pressure distillate or hydrocarbon mixture is conducted from the reboiler 56 into the lower mid-portion of the third fractionating column 98, the latter preferably being maintained at an operating pressure of approximately 60 pounds per square inch absolute, and preferably having a bottom-of-column temperature of around 250° F., and a top-of-column temperature of around 110° F.

While the above-mentioned temperatures and pressure conditions may be satisfactorily employed in the process, it will be understood that the conditions of operation of the various columns may be varied considerably; and that, in the case of column 98 for instance, the vapor pressure desired for the stabilized pressure distillate or gasoline can be controlled by varying the per cent of butane refluxed or by suitably varying the pressure or temperature range at which the volumn is operated. Under the operating conditions named above, the vapor pressure of the average propane-free pressure disillate or gasoline may be lowered to approximately 7.6 pounds per square inch by means of the vaporization resulting from the difference in pressure between the second and third columns and the small amount of reboiling in the third column. Increasing the pressure in the column 98 or decreasing the amount of heating in the reboiler 100 increases the vapor pressure of the stabilized product and reduces the butane yield recovered in the receiver 114; while decreasing the column pressure and increasing the reboiling at the base of the column will decrease the vapor pressure of the stabilized product and increase the butane yield. By increasing the pressure in the column 98 to 70 lbs. per square inch, the propane-free distillate having a vapor pressure of about 9 lbs. per square inch can be produced. The pressure-reducing valve 108 makes possible the maintenance of uniform conditions in the top of the column 98.

It is well known that considerable polymerization occurs when pressure distillate or gasoline is heated to high temperatures in accordance with the practice of the prior art. Such polymerization is avoided or substantially reduced in the first fractionating column 34 by refluxing condensate from condenser 40, and by recycling the propane thereto from the second column receiver 68—thus increasing the vapor pressure of propane in the boiling distillate at the base of the first column and preventing temperature rise above 300° F.

Similarly polymerization of the pressure distillate within the second column is prevented or substantially reduced by recycling butane from the third column receiver 114 and by refluxing propane drawn from receiver 68. Thus the temperatures at the base of the first and second columns are prevented from substantially exceeding 300° F. The temperature at the base of the third column will always be under 300° F., regardless of operating procedure, because of the very materially lower column pressure.

In order to strip valuable components from the gas gathering systems and from the crude still receiving house or gasoline down-run tanks—and for reducing the propane and butane cycle loss in the fractionating columns 34 and 54—the rich gases from the gathering system are compressed and are passed into the absorber 150 in intimate countercurrent contact with condensed unstabilized pressure distillate or wild gasoline, prior to pumping the same under pressure into the fractionating column 34. Only such gases as can be collected with minimum air dilution (from air being drawn into tanks and lines) are suitable for this purpose. The gathered gases can not only be stripped of the pentane and heavier components, but also of a good portion of their propane and butane as well, under suitable pressure and temperature conditions.

The three-column stabilizing plant is a flexible unit, and its operation as hereinbefore described can be controlled to produce at will, maximum or minimum yields of propane and butane and to vary the vapor pressure of the pressure distillate or gasoline as desired for the purpose of meeting seasonal requirements.

While as shown, the condensers 40, 66, and 110 are located laterally of the respective fractionating columns 34, 54 and 98—it is obvious that these may be in the form of reflux condensers adapted to return a selected part of the condensate therefrom by gravity to the top of the respective fractionating columns, proportional amounts of the condensate being conducted away to storage in suitable manner.

The invention obviously is not limited to the treatment of distillates obtained in the pressure cracking of petroleum. On the contrary, it is readily applicable to the treatment of various hydrocarbon mixtures, such as wild gasoline or natural gas gasoline, for the purpose of producing a liquid hydrocarbon mixture of preselected vapor pressure and for the recovery overhead therefrom of propane and butane. In such cases the liquid mixture must be preheated and introduced into the first stabilizing column under high pressure within the pressure range indicated.

In processing crude petroleum oil, the invention may be applied in a number of treatment stages, successively taking off overhead gasoline, kerosene, fuel oil, light lubricating stock and heavy lubricating stock in turn, at correspondingly diminishing pressures. The last stages of treatment may if desired be conducted under subatmospheric pressure.

In many instances it may not be desirable to enrich the condensate in the receiver 22 with gases from the gathering system. In such instances the condensate is conducted from the receiver 22 through the valved lines 24 and 28, direct to the flow tank 26.

The invention is susceptible of modification within the scope of the appended claims.

1. The process of distilling liquid hydrocarbon mixtures having components of different boiling points which comprises, heating the said mixture and passing the same under pressure into a fractionating column and withdrawing vapors from the top of the column, flowing the vapors in the column in countercurrent to a liquid having a vapor pressure below but near that of the vapors leaving the top of the column under the conditions of pressure and temperature within the column, thereby forming in the base of the column a residual liquid mixture enriched with respect to the last-named liquid, condensing the vapors leaving the top of the column, heating the said residual liquid mixture and passing it into a second fractionating column maintained at a pressure substantially less than that at which the first-named column is maintained, passing the resultant vapors in countercurrent contact with a liquid mixture having a lower vapor pressure than that of the vapors removed from the second column under the conditions of temperature and pressure within the second column, conducting away and condensing the thus treated vapors, returning a selected portion of the condensate formed from vapors leaving each fractionating column to the upper part of that column, and conducting another selected portion of the condensate formed from the vapors leaving the second column to the first-named fractionating column.

2. The process of distilling liquid hydrocarbon mixtures having components of different boiling points, which comprises passing a hydrocarbon mixture into a fractionating column maintained at a preselected pressure and at a temperature adapted to maintain a substantial portion of said mixture in vapor state, the said vapors flowing in countercurrent contact with a liquid having a vapor pressure near but below that of the component of the liquid mixture to be recovered from the said vapors, withdrawing vapors from the top of the column and concurrently forming in the base of the column a residual liquid mixture enriched with respect to the said liquid, condensing the vapors leaving the top of the column, heating the said residual liquid mixture and passing it into a second fractionating column maintained at a pressure substantially less than that at which the first-named column is maintained, thereby vaporizing portions of the liquid mixture, passing the resultant vapors in countercurrent contact with a liquid having a vapor pressure lower than but near that of the resultant vapors flowing from the column under the conditions of temperature and pressure within the column, thereafter conducting away and condensing the said resultant vapors, returning a selected portion of the condensate formed from the vapors leaving each column to the upper part of that column, and conducting another selected portion of the resultant condensate formed from the vapors leaving the said second column to the first-named fractionating column.

3. The process of fractionally distilling a hydrocarbon mixture having components of different boiling points which comprises, flowing such liquid mixture successively through a plurality of fractionating columns arranged in series, reheating the liquid mixture in each of the respective fractionating columns, each of the columns being operated at a pressure substantially less than that at which the immediately preceding column is operated, vaporizing portions of the hydrocarbon mixture in each of the respective columns and passing the vapor in each column in countercurrent contact with a liquid hydrocarbon having a lower vapor pressure than that of the vapors flowing from that column, withdrawing the resultant stripped vapors from the respective columns and separately condensing the same, returning a selected portion of each of the resultant condensates to the upper part of the column from which the vapors forming that condensate were withdrawn, conducting another selected portion of each of the resultant condensates from all but the first column to a midportion of the fractionating column immediately preceding that from which the vapors forming the condensate were withdrawn, and recovering a valuable liquid hydrocarbon mixture from the last fractionating column of the said series.

4. The process of stabilizing pressure distillate which comprises rectifying the said distillate under conditions adapted to separate methane and ethane from the remainder of the said distillate, subsequently rectifying the latter in the presence of controlled quantities of an excess of added butane, separately withdrawing from the second rectification propane and a partially stabilized distillate substantially free of propane, thereafter further rectifying the latter in the presence of controlled quantities of butane, separately withdrawing from the last-named rectification butane and a rectified pressure distillate of preselected vapor pressure, and effecting each of the said rectifications under a super-atmospheric pressure substantially less than that employed in the immediately preceding rectification step.

5. The process of stabilizing pressure distillate which comprises, rectifying the said distillate in the presence of added propane under high pressure and at a temperature not higher than 300° F., thereby separating methane and ethane from the remainder of the distillate, subsequently rectifying the latter in the presence of added butane at superatmospheric pressures substantially below that employed in the first rectification and within a temperature range of from 110° F. to 300° F., separately withdrawing from the second rectification propane and a rectified liquid distillate substantially free of propane, thereafter rectifying the latter in the presence of refluxed butane under superatmospheric pressure lower than those employed in the first two rectifications and in a temperature range of from 110° F. to 250° F., and separately withdrawing from the last-named rectification butane and rectified pressure distillate.

6. The process of stabilizing a mixture of liquid hydrocarbons, which comprises successively rectifying such liquid mixture under superatmospheric pressure, substantially reducing the said pressure between one rectification and the next successive rectification, maintaining a temperature differential of from approximately 110° F., to approximately 250°–300° F. during each rectification, and conducting at least one of the rectification steps in the presence of a controlled amount of a hydrocarbon recovered directly in a subsequent rectification step of the process, the amount of said hydrocarbon thus employed being sufficient to provide during that rectification in which it is used, a vapor pressure suitably high to prevent rise of temperature above 300° F. in the liquid mixture being rectified, thereby preventing substantial polymerization of the hydrocarbons.

7. The process for stabilizing hydrocarbon mixtures to recover therefrom a valuable liquid and a single hydrocarbon fraction of narrow boiling range, which comprises conducting the said mixture under high superatmospheric pressure into a stabilizing column having a temperature from top to bottom, of 110° F. to 300° F., separately recovering the thus-partially rectified liquid and a gaseous mixture principally comprising methane and ethane, introducing the partly-rectified liquid into a second stabilizing column maintained at a superatmospheric pressure substantially lower than that of the first column and having therein a temperature gradient approximately that of the first column, separately withdrawing propane and a partially-stabilized liquid mixture containing butane and higher hydrocarbons, condensing the propane and returning selected portions thereof to the upper portion of the first-named stabilizing column, conducting additional selected portions of the propane respectively to the upper portion of the second-named stabilizing column and to storage, introducing the last-named partially-stabilized liquid mixture to a third stabilizing column maintained at a superatmospheric pressure substantially below that at which the second-named stabilizing column is operated and having therein a temperature from top to bottom from 110° F. to 250° F., separately withdrawing therefrom a stabilized liquid hydrocarbon mixture and butane, condensing the latter, introducing a selected portion of the butane into the second-named stabilizing column, refluxing in the third stabilizing column another selected portion of the butane, and separately conveying the remainder of the condensed butane and the stabilized hydrocarbon mixture to storage.

8. The process for the recovery from rich waste gases from a gathering system associated with the cracking of petroleum of the propane and butane components thereof, which comprises passing the said gases under superatmospheric pressure in intimate contact with a liquid hydrocarbon mixture adapted to absorb the valuable hydrocarbon components of such gases, thereafter heating such liquid mixture and introducing it under high pressure into a fractionating column maintained at a temperature from top to bottom from 70° F. to 300° F., separating the resultant liquid mixture from the vapors and gases, and conducting the former to a second fractionating column maintained at a superatmospheric pressure substantially below that maintained at a superatmospheric pressure substantially below that maintained in the first-named fractionating column and maintained within approximately the same temperature range as the first-named fractionating column, separating propane vapors from the residual liquid mixture and conducting the latter into a third fractionating column maintained at a superatmospheric pressure substantially below that maintained in the second-named fractionating column and maintained within approximately the same temperature range as the said column, separating in the third column butane vapors from the residual stabilized hydrocarbon mixture, conducting the latter to storage, separately condensing the said propane vapors and butane vapors respectively removed overhead in the second and third fractionating columns, and utilizing selected portions of the resultant condensates respectively for controlling the vapor pressures and the maximum temperatures in the first and the second fractionating columns, and separately conducting other portions of each of the last-named condensates to storage.

9. In apparatus for the distillation of hydrocarbons, a plurality of fractionating columns arranged in series, a reheater operatively associated with the base of each column, means for introducing into the mid-portion of the first column a liquid mixture to be fractionally distilled, means for conducting a liquid from the base of each column to a mid-portion of the next succeeding column, means for withdrawing liquid from the base of the last fractionating column of the series, a plurality of condensers, each of which is operatively associated with a corresponding column of the series, valve-controlled means for conducting vapors from the top of each column to the corresponding condenser, independent reflux means establishing controlled communication between each condenser and the upper portion of the fractionating column with which the condenser is associated, the last-named means being adapted to control the flow of condensate from the condenser to the said column, independent valve-controlled means connecting each condenser with a mid-portion of the immediately-preceding fractionating column to that with which the condenser is associated, and means for separately withdrawing surplus liquids from the respective condensers and for conducting the same to storage.

10. Apparatus for stabilizing hydrocarbon mixtures, comprising three stabilizing columns arranged in series, means respectively connecting the lower portion of each of the said columns with the mid-portion of the immediately succeeding column, means for heating the respective columns, an overhead vapor line leading from each of the said columns, condensers in each of the respective vapor lines from the respective columns, means for introducing a liquid under pressure into the mid-portion of the first stabilizing column, means for removing stabilized liquid mixture from the lower portion of the third stabilizing column, valve-controlled means connecting with separate storage vessels the condensers associated with the respective second and third stabilizing columns, separate means for returning under pressure a selected portion of the condensate from each column to the upper portion of the said column, means for introducing a selected portion of the condensate from the second column into the upper portion of the first column, and means for introducing a selected portion of the condensed vapors from the third column into the mid-portion of the second column.

11. Hydrocarbon stabilization apparatus which comprises three pressure-resistant stabilizing columns arranged in series, valve-controlled connections including a reheater establishing communication between the lower part of the first column and the mid-portion of the second column, valve-controlled connections comprising a reheater establishing communication between the lower portion of the second column and the third column, a reheater connected with the third column, pressure means for introducing a liquid hydrocarbon mixture into the mid-portion of the first column, means for conducting overhead vapors from the first column and for cooling and condensing portions thereof, means for refluxing the resultant condensate in the first stabilizing column, means for removing vapors overhead from the second column and for condensing the same, means for introducing controlled portions of the last-named condensate into the upper portion of the first-named column, separate means for conducting overhead vapors from the third column and for condensing the same, means for conducting controlled portions of the last-named condensate to the mid-portion of the second column, separate means for conducting selected portions of the last-named condensate respectively to storage and to the upper portion of the third column, and means for conducting to storage stabilized liquid hydrocarbon mixture in the lower part of the third column.

12. The process of distilling hydrocarbon mixtures having components of different boiling points, which comprises passing the hydrocarbons to be distilled into a fractionating column and withdrawing vapors from the top of the column, flowing the said vapors in the column in countercurrent to a liquid having a vapor pressure below that of the vapors leaving the top of the column under the conditions of pressure and temperature within the column, thereby forming in the base thereof a residual liquid mixture enriched with respect to the last-named liquid, condensing vapors leaving the top of the column, heating the said residual liquid mixture and passing it into a second fractionating column maintained at a pressure substantially less than that at which the first-named column is maintained, passing the resultant vapors in countercurrent contact with a liquid mixture having a lower vapor pressure than that of the vapors leaving the second column under the conditions of temperature and pressure within the second column, conducting away and condensing the thus-treated vapors, returning a selected portion of the condensate obtained from each fractionating column to the upper part of that column, and conducting another selected portion of the condensate formed from the vapors leaving the second column to the first-named fractionating column.

13. In the process of stabilizing an unstable hydrocarbon distillate containing propane and other normally gaseous constituents of higher vapor pressure in which said distillate is subjected to fractionation in a fractionating tower, the improvement which comprises introducing substantially pure propane into said tower in intimate contact with said distillate to strip therefrom constituents having a higher vapor pressure than propane, and separately withdrawing from said tower the stripped constituents and the resulting distillate which contains a greater proportion of propane than the original distillate but which is substantially free of said higher vapor pressure constituents.

14. The process of removing constituents of relatively high vapor pressure from a crude gasoline containing a mixture of constituents including constituents of relatively high vapor pressure which tend to render the gasoline unstable, which comprises passing the crude gasoline into a rectifying tower comprising a rectifying zone in which the temperature and pressure conditions are such as to permit vaporization of the constituents of relatively high vapor pressure, maintaining a high superatmospheric pressure in said zone, and aiding in stripping the undesired high pressure constituents from the crude gasoline by introducing into said zone at an intermediate point in contact with said gasoline a hydrocarbon constituent having a vapor pressure lower than but closely adjacent to that of said high vapor pressure constituents.

15. The method of stabilizing light naphtha, which comprises introducing the naphtha to be stabilized into a distilling tower comprising a rectifying zone and introducing thereinto in intimate contact with the naphtha an excess of a hydrocarbon fraction of about the vapor pressure of butane to materially increase the proportion of such fraction in said zone to thereby replace hydrocarbons of higher vapor pressure, and maintaining the conditions in said zone such that any hydrocarbons of higher vapor pressure than that of btuane contained in said naphtha are vaporized and removed from the rectifying zone.

16. The method of stabilizing light naphtha containing undesirable low boiling constituents, which comprises fractionating the naphtha in a fractionating zone in the presence of an added butane fraction having a vapor pressure not higher than that of butane whereby propane is replaced in the unstabilized naphtha by the butane fraction, removing the propane as vapor and the resulting naphtha as liquid from said zone, separating a butane fraction from the resulting stabilized naphtha in a separate zone and returning at least a portion of the separated butane fraction to said fractionating zone to replace propane from further quantities of naphtha.

17. A continuous process for stabilizing unstable gasoline containing undesirable low boiling point constitutents, which comprises continuously introducing the unstable gasoline into a fractionating column and subjecting it to rectifying conditions therein, continuously introducing into the column a butane fraction having a vapor pressure higher than that of gasoline but not higher than that of butane whereby constituents of higher vapor pressure are replaced in the unstable gasoline by said fraction, discharging the replaced constituents in vapor form from the column, continuously removing the stabilized gasoline including said introduced fraction from said column in liquid form and separating from the gasoline the hydrocarbon material comprising said fraction, and returning at least a portion of the separated fraction to said column.

18. The process of stabilizing an unstable gasoline, which comprises rectifying the unstable gasoline in a fractionating column in which a temperature is maintained sufficiently high to vaporize relatively low boiling undesirable constituents of the unstable gasoline, introducing into the column a relatively narrow hydrocarbon fraction having a boiling point higher than said undesired constituents but closely adjacent thereto to materially increase the proportion of such fraction in the gasoline, said introduced fraction having the function of displacing said undesirable constituents from the gasoline being rectified under the temperature and pressure conditions maintained in the rectifying column, discharging the displaced undesirable constituents from the top of the column in vapor form and discharging the resulting gasoline as liquid from the lower part of the column.

19. The method of removing dissolved gaseous hydrocarbons with a vapor pressure higher than that of butane from light naphtha, which comprises fractionating the said naphtha in a fractionating tower, replacing said dissolved hydrocarbons in the naphtha being fractionated in said tower with a gas having a vapor pressure not higher than that of butane, and discharging the replaced gaseous hydrocarbons overhead as a vapor from said fractionating column.

20. The process of recovering desirable hydrocarbon constituents from a mixture of hydrocarbon gases containing desirable constituents and relatively lower boiling undesirable constituents, which comprises passing the hydrocarbon gaseous mixture through an absorption zone in intimate contact with an absorbing medium whereby desirable and undesirable constituents of said mixture are absorbed in said medium, introducing the rich absorption medium into a fractionating column to fractionate therefrom the absorbed undesirable constituents, introducing into said fractionating column a butane fraction of immediately higher boiling point than said undesired constituents in sufficient quantity to replace said undesired constituents in the mixture being treated in said column, withdrawing the undesired constituents overhead in vapor form from the column condensing portions of the overhead and returning at least a part of the resulting condensate to the top of the column as reflux, and withdrawing the desired constituents and those of said introduced fraction in liquid form substantially free of said undesirable constituents from the lower part of the column.

21. The method of removing dissolved gaseous hydrocarbons with a vapor pressure higher than that of butane from naphtha, which comprises fractionating the said naphtha in a fractionating column, replacing said dissolved hydrocarbons in the naphtha being fractionated in the said column by increasing the partial vapor pressure of a constituent in said column having a slightly lower vapor pressure than that of said dissolved gaseous hydrocarbons by introducing such constituent into said column, and discharging the replaced gaseous hydrocarbons substantially free of said introduced constituent overhead from said fractionating column.

22. The process of stabilizing a cracked hydrocarbon oil distillate to produce a stable motor fuel, which comprises introducing the unstable distillate containing normally gaseous hydrocarbons of lower molecular weight than butane into a rectifying column and rectifying the distillate therein by maintaining a substantially higher temperature at the bottom of the column than at the top, introducing a narrow butane hydrocarbon fraction into said rectifying column in addition to such constituents contained in said distillate to displace said lower molecular weight hydrocarbons and effect the rectification with a bottom temperature in said column substantially lower than is usually necessary, withdrawing the displaced hydrocarbons in vapor form from the upper part of said column, and withdrawing the resulting distillate augmented by the constituents of said butane fraction from the lower part of said column.

23. The process of removing propane and lighter hydrocarbons from gasoline, comprising subjecting said gasoline to a rectification operation in a rectifying tower at a pressure of approximately 200 lbs. per square inch and a temperature at the bottom of the tower of approximately 300° F., introducing a narrow butane hydrocarbon fraction substantially free from lighter hydrocarbons at an intermediate point in said tower to aid in the rectification operation and removal of propane and lighter hydrocarbons from the gasoline, withdrawing the propane and lighter hydrocarbons in vapor form from the upper part of the tower, and withdrawing from the lower part of the tower the gasoline augmented by the constituents of said butane fraction.

24. In the process of stabilizing an unstable gasoline containing low boiling undesirable constituents by subjecting the gasoline to distillation in a rectifying column, the improvement which comprises continuously passing the gasoline mixture to be stabilized into a rectifying column maintained at a preselected superatmospheric pressure and at a temperature at the bottom of the column adapted to maintain a substantial portion of the mixture in the vapor state, continuously introducing into the column a relatively narrow boiling range butane fraction having a vapor pressure immediately lower than that of the undesirable constituents of the gasoline mixture, passing the vapors produced in the column upwardly therethrough countercurrent and in intimate contact with liquid flowing downwardly through the column, withdrawing the undesired relatively low boiling constituents in vapor form from the top of the column, and concurrently forming in the base of the column a liquid mixture enriched with respect to constituents of said introduced narrow boiling range butane fraction, and withdrawing the said liquid mixture from the base of the column.

25. The process of separating propane from a hydrocarbon mixture containing propane and higher boiling hydrocarbons and of recovering the propane in substantially pure form therefrom, which comprises continuously introducing the hydrocarbon mixture containing the propane into a fractionating column and therein subjecting it to rectifying conditions including the maintenance of a relatively high superatmospheric pressure in the column and a substantially higher temperature at the bottom of the column than at the top, continuously introducing a butane fraction into the column at an intermediate point and intimately contacting it with the hydrocarbon mixture subjected to rectification therein, withdrawing propane in vapor form from the top of said column, and withdrawing the remainder of the hydrocarbon mixture enriched by the introduced butane from the lower part of the column.

26. The process of removing propane and lighter hydrocarbons from gasoline, comprising subjecting said gasoline to rectification in a tower, introducing excess butane substantially free of lighter hydrocarbons into the tower to aid in the rectification of the gasoline and the removal of the propane and lighter hydrocarbons therefrom, removing the propane and lighter hydrocarbons as vapors from the top of the tower, withdrawing the rectified gasoline containing the introduced excess butane from the lower part of the tower, and thereafter heating the resulting gasoline in a separate tower to expel a portion of the butane content thereof to provide a gasoline of desired vapor pressure.

DAVID G. BRANDT.

CERTIFICATE OF CORRECTION.

Patent No. 2,168,316.  August 8, 1939.

DAVID G. BRANDT.

It is hereby certified that error appears in the printed specification of the above numbered patent requiring correction as follows: Page 2, second column, line 11, for the word "receiving" read recovering; line 20, for "flow of" read flow; page 3, second column, line 40, for "volumn" read column; page 5, second column, lines 50 and 51, claim 8, strike out the words "maintained at a superatmospheric pressure substantially below that"; page 7, first column, line 8, claim 15, for "btuane" read butane; line 71, claim 19, for "column" read tower; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.